Jan. 5, 1937.  J. BELLIS  2,066,667
CARBURETOR CONTROL MECHANISM
Filed May 22, 1933  2 Sheets-Sheet 1
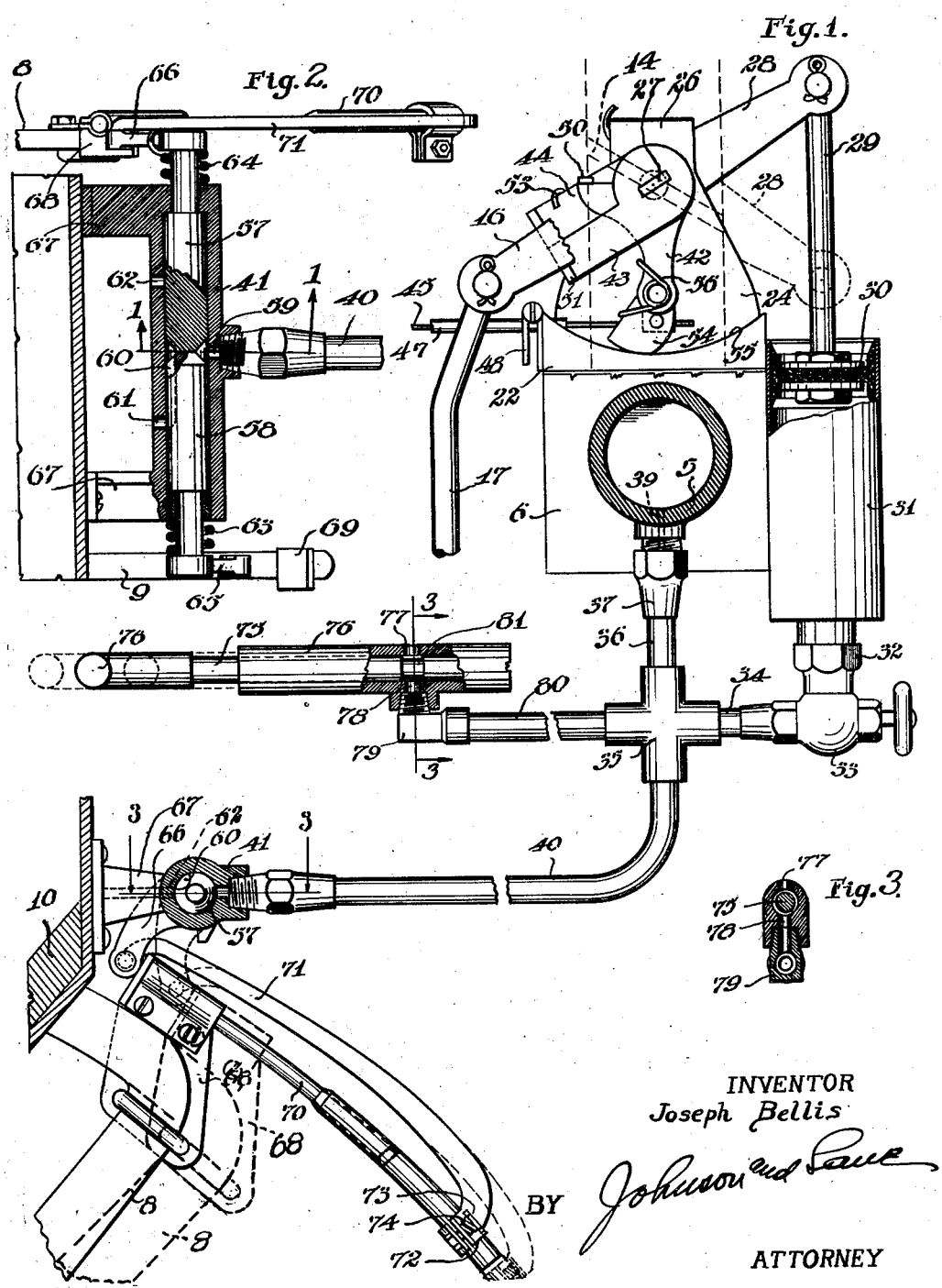
INVENTOR
Joseph Bellis
BY Johnson and Lane
ATTORNEY Jan. 5, 1937. J. BELLIS 2,066,667
CARBURETOR CONTROL MECHANISM
Filed May 22, 1933 2 Sheets-Sheet 2
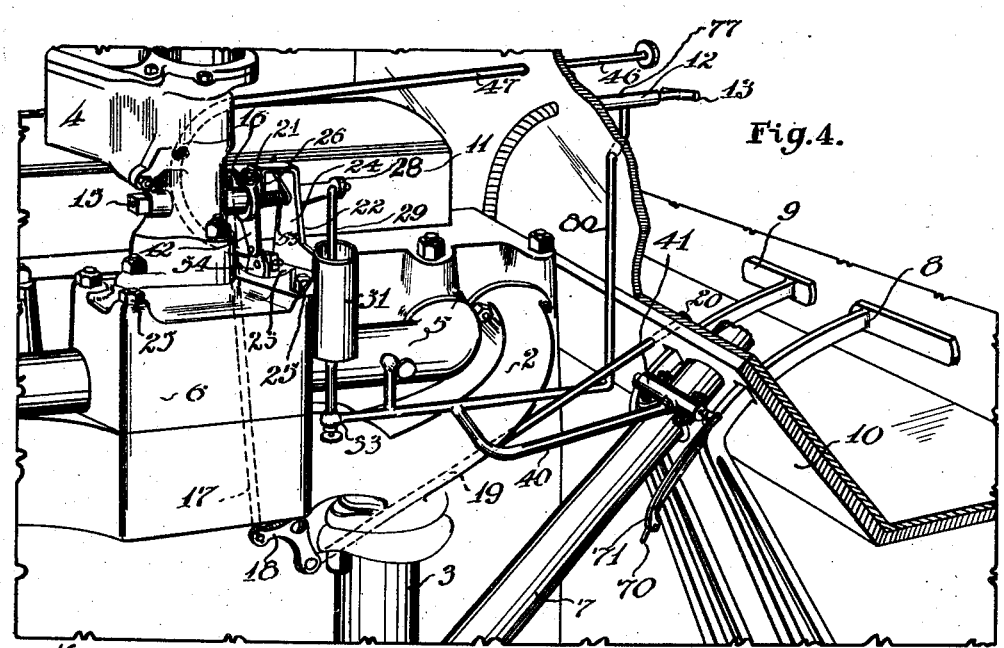
Fig. 4.
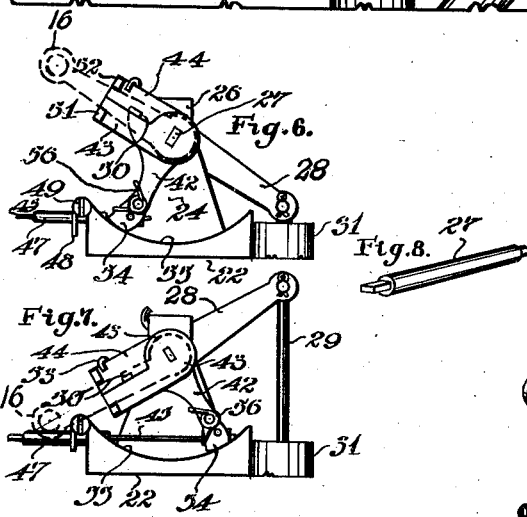
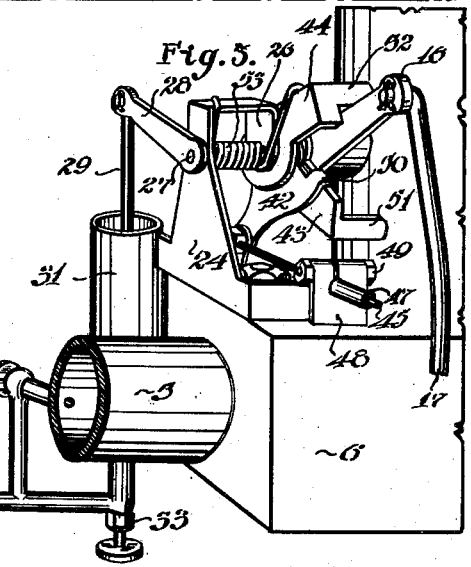
Fig. 5.
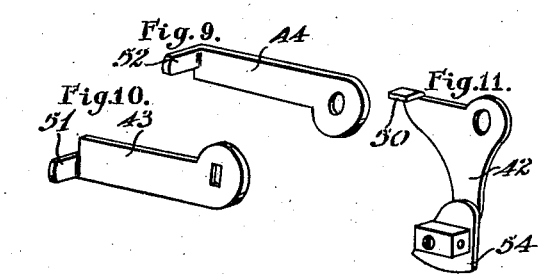
INVENTOR
Joseph Bellis
BY Johnson and Lane
ATTORNEYS Patented Jan. 5, 1937

2,066,667

UNITED STATES PATENT OFFICE 2,066,667

CARBURETOR CONTROL MECHANISM

Joseph Bellis, St. Paul, Minn.

Application May 22, 1933, Serial No. 672,151

10 Claims. (Cl. 192—.01)

The present invention relates to a carburetor control mechanism for automobiles.

In driving an automobile having clutch and brake operating members, such as the customary clutch and brake pedals, and having an accelerator pedal, the driver of the automobile is required to manipulate the accelerator pedal to provide the proper motor speed for each of the various operations of the automobile. In starting the automobile, and in shifting of gears, a high sense of coordination is required on the part of the driver, as well as a considerable amount of effort to provide the proper motor speeds for the various operations required, and this is still further complicated in starting a car stopped on a hill and headed toward the top of the hill, since the brake pedal and foot accelerator of the present cars are arranged to be operated by the same foot.

Various types of carburetor control mechanisms have been previously devised, such as are shown in my Patents No. 1,897,357, and No. 1,897,358, and co-pending application, Serial No. 623,040. These previous devices, while operating satisfactorily, nevertheless are open to certain objections, and, owing to the wide variety in design of the different types of automobiles, it has been found necessary to manufacture several different models of the control mechanisms in question, as well as various adaptors, fittings, and parts in order to permit the installation of such control mechanisms to the many different types of automobiles now in use.

An object of the present invention is to make an improved and simplified carburetor control mechanism.

In order to attain this object, there is provided, in accordance with one feature of the invention, a pressure actuated member in open communication with the intake manifold of an automobile, and carburetor control means connecting said pressure actuated member to a carburetor to operate said carburetor by means of atmospheric pressure acting in opposition to a reduced pressure in the automobile intake manifold, while the motor is in operation. Release valve means arc provided and are arranged to be operated by operative movements of the clutch and brake control mechanism of the automobile, to operate the pressure actuated carburetor control mechanism by controlling the pressure on the pressure actuated member.

These and other features of the invention will be more fully brought out in the following description and the accompanying drawings, wherein:

Figure 1 is a fragmentary view showing a carburetor control mechanism mounted on the intake manifold of an automobile engine, the intake manifold and floor boards of an automobile being shown in section, a clutch and brake pedal control mechanism being shown and a gear shift member being shown, parts of the various mechanisms being broken away, a portion thereof being shown sectionally on line 1—1 of Figure 2.

Figure 2 is a plan view, partly in section, of a pedal operated release valve mechanism.

Figure 3 is a sectional view on the line 3—3 of Figure 1.

Figure 4 is a view in perspective of a portion of an automobile showing a control mechanism embodying the present invention installed thereon.

Figure 5 is an enlarged view in perspective of a portion of a throttle control mechanism which is mounted on a carburetor element.

Figure 6 is a view in side elevation of a portion of the throttle operating mechanism, showing the position of the mechanism when the throttle is in an open position.

Figure 7 is a view, similar to Figure 6, showing the throttle operating mechanism in position to close the throttle.

Figure 8 is a view in perspective of a shaft for a throttle control assembly.

Figure 9 is a view, also in perspective, of a throttle control arm adapted to be pivotally mounted on the shaft shown in Figure 8.

Figure 10 is a view in perspective of a throttle control arm adapted to be fixedly secured to the shaft shown in Figure 8; and Figure 11 is a view, also in perspective, of an adjustable stop member adapted to be pivotally mounted on the shaft shown in Figure 8.

Referring to the drawings in detail, reference is made to Figure 4, wherein the parts of a conventional type of automobile necessary to support and operate the mechanism embodying the present invention are illustrated. These parts comprise an internal combustion motor 1, having a conventional exhaust manifold 2, exhaust pipe 3, carburetor 4, intake manifold 5, gas preheater, or hot plate manifold 6, steering column 7, clutch pedal 8, brake pedal 9, floor 10, and valve cover 11. An automatic gear shift mechanism is indicated at 12, and although this automatic gear shift mechanism is a recent innovation, it is already well known to those familiar with the art, and, since it is merely the operative positions of the operating handle 13 which pertain to the present invention, it will be necessary merely to refer to the operating positions of the handle 13 thereof, to enable one skilled in the art to perceive the application of this mechanism to my present invention.

A carburetor control valve 14 has a conventional type of shaft 15 and throttle control valve operating arm 16. The throttle valve control arm 16 is connected in a conventional manner by means of a link 17, bell crank lever 18, and rod 19, to a throttle pedal 20. The throttle arm 16 is rigidly and permanently connected to the carburetor control valve shaft 15 in a customary manner. A conventional adjustable throttle stop member 21, to control the idling speed of the motor, is shown in Figure 4.

Referring now to the mechanism comprising the present invention, a bracket 22 has a base portion 23 with openings therein to receive bolts 25, which are the bolts used to connect together the two portions of the carburetor hot plate manifold 6. This bracket 22 has a vertically extending side portion 24, a horizontally disposed upper portion, and a downwardly bent forward portion 26. A shaft 27 is mounted for free rotation in the vertical portions 24 and 26 of the bracket 22. This shaft 27 is co-extensive with, but separated from the carburetor valve shaft 15 when the bracket is mounted in operative position, as illustrated, so that the shaft 27 may move independently of the valve shaft 15. An arm 28 is fixedly secured to the outer end of the shaft 27 and a rod 29 is pivotally connected to the free end of the arm 28. A piston 30 (see Figure 1), is mounted on the lower end of the rod 29 and this piston 30 is slidably mounted in a cylinder 31 to be slidable therein and to have an air-tight seal with the walls thereof. The lower end of the cylinder 31 is connected by means of pipe fitting 32, needle valve 33, and nipple 34 to a cross pipe fitting 35. This cross fitting is connected at its upper end by means of a nipple 36 and fitting 37 to the intake manifold 5 of the motor through a small opening 39, and is in open communication with the cylinder 31 by means of the valve and fittings previously mentioned. In the lower end of the cross fitting 35 a tube 40 is connected to a release valve 41 to be described in detail later in the specification. This piping structure is somewhat modified as shown in Figure 4, but the operation thereof will be clearly apparent to those versed in the art.

Turning now to the throttle operating mechanism carried by the bracket 22, three arms 42, 43, and 44 are mounted on the inner end of the shaft 27 beyond the downwardly bent portion 26 of the bracket 22. The arms 42 and 44 are mounted to pivot freely on the shaft 27 and the arm 43 is fixedly secured to said shaft to rotate therewith. The arm 42 is connected by a throttle wire 45 to an adjustable hand throttle member 46 which is frictionally mounted in a tube 47 to be frictionally held in adjusted position therein, in a well known manner, when set to an adjusted position by the driver of an automobile. The tube 47 is fixedly secured in a bracket 48 formed integrally with the bracket 22, the tube 47 being locked in adjusted position by means of a bolt 49. The arm 42 has a lug 50 bent at right angles thereto to overlie the arm 43 to limit the upward movement of the arm 43 under the action of the piston 30 and associated parts. The arm 43 has a lug 51 bent at right angles at the outer end thereof to extend into the path of movement of the throttle arm 16 and a similar lug 52 is carried by the outer end of the arm 44. A coil spring 53 surrounds the shaft 27 between the portions 24 and 26 of the bracket 22, one end of said spring engaging the upper portion thereof, the other end of the spring 53 engaging the arm 44 to resiliently urge it downward to move the throttle arm 16 toward a closed position. The resiliency of the spring 53 permits the arm 44 to be moved upwardly by the throttle arm 16 beyond an adjusted position upon depressing the foot throttle.

A cam shoe 54 is pivotally mounted on the lower end of the arm 42 and rides on a curved cam surface 55 formed in an upwardly bent portion of the bracket 22. A light spring 56 resiliently forces the shoe 54 into engagement with the cam surface 55 to prevent further opening of the carburetor valve beyond an adjusted position by the urging power of the piston, although the cam shoe 54 is not essential to the invention, providing the frictional engagement of the hand throttle is sufficient to insure against such further opening of the carburetor valve.

A release valve 41 comprises a casing having a cylindrical opening therethrough in which are mounted a pair of release valve members 57 and 58. These valve members are tapered at their inner ends to provide an annular air passage in open communication with a duct 59 leading into the tube 40. The valve members 57 and 58 are here shown as in endwise abutment, but are free for independent pivotal movement with respect to each other. The valve members 57 and 58 are each provided with a longitudinally disposed groove 60, which grooves are adapted to register, respectively, with openings 61 and 62 in the valve housing.

A pair of coil springs 63 and 64 surround the outer ends of the valve members 57 and 58, respectively, and engage valve operating arms 65 and 66, respectively, to normally hold the grooves 60 in registry with the holes 61 and 62. Supporting brackets 67 support the valve structure in a position so that the arms 66 and 65 will be engaged by brackets 68 and 69, clamped to the clutch pedal 8, and brake pedal 9, respectively. Upon depressing either the clutch or brake pedal, the valve associated therewith will be released and moved to the open position by means of the spring 63 or 64 associated therewith. This admits air under atmospheric pressure through the valve and into the tube 40 and thence to the cylinder 31, thereby balancing the pressure on both sides of the piston 30 and permitting the spring 53 to move the arm 44 downward to close the carburetor valve.

An auxiliary device carried by the clutch pedal only and adapted to open the carburetor in advance of the engagement of the clutch on releasing the clutch pedal, comprises an extension 70 having a reduced upper portion and an enlarged lower portion. A link 71 is pivotally connected to the valve operating arm 66 and has a split collar 72 at its lower end which is held together by bolts 73 which are encircled by springs 74 to resiliently urge the two halves of the split collar together to frictionally engage the enlarged lower portion of the extension 70. The split collar is of a size to pass freely over the reduced upper portion of the extension 70. By means of this arrangement, upon depressing the clutch pedal 8, the valve member 57 will be moved to the open position as the clutch pedal reaches the dotted line position shown in Figure 1. From this point on further depression of the clutch pedal 8 slides the enlarged lower portion of the extension 70 through the split collar 72 until the reduced upper portion of the extension 70 enters the split collar 72. Upon releasing the clutch pedal there is no action on the valve member 57 until the enlarged lower portion of the extension 70 enters the split collar 72, at which point the frictional engagement of the enlarged lower portion of the extension 70 with the split collar 72 urges the member 71 upwardly, moving the arm 66 to the solid line position of Figure 1, closing the release valve. This causes the suction in the intake manifold to reduce the pressure in the cylinder 31, moving the piston 30 downwardly in the cylinder 31 until the arm 43 is engaged by the stop member 50 on the member 42, thereby opening the carburetor control valve to an adjusted position. The speed of opening of the control valve can be regulated by the needle valve 33 in an apparent manner.

In the automatic gear shift handle structure, shown in Figures 1 and 4, a conventional type of operating rod 75 is provided with an operating handle 76, the rod 75 being slidably mounted in a tubular casing 76. The tubular casing 76 is provided with an opening 77, open to the atmosphere, and a second opening 78 opening into a fitting 79, which is connected by a tube 80 to the cross fitting 35. The rod 75 is provided with a reduced portion 81 which is adapted to register, when the gear shift mechanism is in the neutral or inoperative position, with the openings 77 and 78, thereby admitting air under atmospheric pressure into the tube 80 and thence to the cylinder 31 permitting the spring 53 to move the arm 44 and the throttle arm 16 with which it is in engagement downwardly to close the throttle.

The operation of the mechanism is as follows:
Assuming that the gear shift member 75 is in an operative position, as indicated by either of the dotted line positions of Figure 1, and that the clutch pedal 8 is depressed, the lever 66 will be in the dotted line position shown in Figure 1 to bring the groove 60 of the valve member 57 into registry with the port 62, thereby admitting air under atmospheric pressure through the tube 40, cross fitting 35, tube 34, needle valve 33, and fitting 32 into the cylinder 31, thereby permitting the spring 53 to move the throttle lever 16 to the closed position shown in Figure 1. If desired, the foot throttle 20 may be used to open the throttle in this condition of the mechanism, or, in fact, at any stage of its operation, without moving the member 42 and its associated parts from an adjusted position, since the foot throttle is connected as previously described, to the throttle arm 16, and since the arm 44 is loosely mounted on the shaft 27, as previously described, and is resiliently urged to the closed position by the action of the spring 53.

If it is desired to immediately start automatic functioning of the throttle control mechanism, the adjustable throttle rod 46 may be drawn out to a desired position, which the driver of the car, through experience, estimates to be the approximate position at which it is desired to operate. This moves the lever 42 clockwise to a position such as shown in Figure 1. Upon releasing the clutch pedal the frictional engagement of the enlarged lower portion of the extension 70 with the split collar 72 raises the link 71 upwardly, thereby moving the lever 66 to the solid line position shown in Figure 1, and moving the groove 60 in the member 57 out of registry with the port 62. If the brake pedal 9 is also in an upward or released position, this closes the valves 57 and 58 thereby closing the tube 40 to air under atmospheric pressure. The reduced pressure on the intake manifold 38, due to the operation of the automobile engine, in a well known manner, will be transmitted through the duct 39, fitting 37, tube 36, fitting 35, and thence to the cylinder 31. The atmospheric pressure on the piston 30 will then force the piston downwardly in the cylinder 31 drawing the rod 29 and lever 28 downwardly until the arm 43 engages the lug 50 on the arm 42. The arm 43, by means of the lug 51, carries the throttle lever 16 upwardly with it until the lever 43 engages the lug 50, which limits the opening movement of the throttle lever 16 to the adjusted position of the hand throttle 46. If the brake is applied at any time during the operation of the automobile, when the car is running in the adjusted position above described, the brake pedal 9 moves the projection 69, carried thereby, downwardly with it, thereby permitting the spring 63 to move the arm 65 to the position shown in Figure 2 to bring the groove 60 in the valve member 58 into registry with the port 61, thereby admitting atmospheric pressure to the tube 40 to close the carburetor valve by the action of the spring 53 as above described.

While the structure is herein illustrated and described as embodied in an automobile having the present standard clutch and brake pedals, it is understood that other and probably superior clutch and brake operating means may be substituted for such present operating means, and it would, therefore, be but the work of an ordinary mechanic to embody the present invention in such modified clutch and brake operating devices. It is to be understood, therefore, that the invention as described and claimed herein is intended to include the embodiment of the present invention in automobiles and other motor driven vehicles having such modified clutch and brake operating means.

I claim:
1. A carburetor control mechanism for an automobile having a motor, a control pedal, a foot throttle, a separately adjustable throttle and a carburetor control valve operatively connected thereto, comprising means normally urging said control valve to a closed position, motor actuated means operatively connected to said automobile motor and to said control valve to urge said control valve to an open adjusted position upon an actuation thereof, release means connected to said motor actuated means, said release means being positioned to be actuated by an operative movement of said control pedal to render inoperative said motor actuated means.

2. A carburetor control mechanism for an automobile having a motor, a control pedal, a foot throttle, and a carburetor control valve operatively connected thereto, comprising resilient means mounted to normally close said control valve, motor actuated means engaging an opposed portion of said control valve to move said valve against the action of said resilient means, adjustable means mounted to limit the operative movement of said motor actuated means to retain said control valve in adjusted position, and release means connected to said motor actuated means and having an operative portion thereof positioned adjacent said pedal to be moved to a releasing position by an operative movement of said pedal to release said motor actuated means.

3. A carburetor control mechanism for an automobile having a motor, a control pedal, a foot throttle, and a carburetor control valve operatively connected thereto, comprising resiliently actuated means mounted to engage a portion of said control valve to urge said control valve in a predetermined direction, a motor actuated element mounted to engage an opposed portion of said control valve to move said control valve in opposition to said resiliently actuated means, adjustable stop means mounted to limit an opening movement of said control valve, and release means operatively connected to said motor actuated means and having an element thereof positioned to be engaged by an operative movement of said control pedal to release said motor actuated means from operative engagement with said control valve.

4. A carburetor control mechanism for an automobile having a motor, a control pedal, a foot throttle, and a carburetor control valve operatively connected thereto, comprising a bracket mounted laterally adjacent said control valve, a pivotally mounted shaft aligned with said control valve, an arm fixedly secured to said shaft to operate said control valve on a predetermined movement of said shaft, a pressure actuated member operatively connected to a motor element and to said shaft to operate said control valve, adjustable stop means mounted to limit the movement of said control valve upon an operation thereof by said pressure actuated means, and a release valve positioned adjacent said control pedal and connected to said pressure actuated means, said release valve having an operative portion thereof mounted to be actuated by an operative movement of said control pedal to release said pressure actuated means and said carburetor control valve thereby.

5. A carburetor control mechanism for an automobile having a foot pedal, comprising a bracket adapted to be mounted adjacent a carburetor control element, a pair of arms pivotally mounted on said bracket, each of said arms having a portion thereof positioned to operate said carburetor control element, a pressure actuated element adapted to be connected to a portion of a motor having a pressure therein different from atmospheric pressure, means connecting said pressure actuated element to one of said arms to move said carburetor control element to an open adjusted position, spring means connected to the other of said arms to normally close said carburetor control element, and release means adapted to be mounted adjacent the foot pedal of the automobile to render inoperative said pressure actuated means upon an operative movement of said foot pedal to release said carburetor control element for closing by said spring means.

6. A carburetor control mechanism for an automobile having a motor, a control pedal, a foot throttle, a separately adjustable throttle, a carburetor control valve operatively connected thereto, and gear shift means, comprising means normally urging said control valve to a closed position, motor actuated means operatively connected to said motor and to said control valve to urge said control valve to an adjusted open position upon an actuation thereof, release means connected to said motor actuated means, said release means being positioned to be actuated by an operative movement of said control pedal to release said motor actuated means, and release means positioned to be actuated by an operative movement of said gear shift means to release said motor actuated means.

7. A carburetor control mechanism for an automobile having a motor, a control pedal, a foot throttle, and a normally closed carburetor control valve operatively connected thereto, comprising motor actuated means mounted to open said control valve on an actuation thereof, adjustable means mounted to limit the opening of said valve by said motor actuated means, and release means positioned to be actuated by an operative movement of said control pedal to release said motor actuated means.

8. A carburetor control mechanism for an automobile having a motor, a control pedal, a foot throttle, and a carburetor valve operatively connected thereto, comprising motor actuated means mounted to open said control valve on an actuation thereof, adjustable means mounted to limit the opening of said valve, resilient means normally holding said carburetor valve in the position of said motor actuated means, said carburetor valve being movable against said resilient means to open said throttle valve beyond the position of said motor actuated means without disturbing said adjustable means, and release means positioned to be actuated by an operative movement of the pedal to release said motor actuated means.

9. A carburetor control mechanism for an automobile having a motor, a control pedal, a foot throttle, and a normally closed carburetor control valve operatively connected thereto, comprising motor actuated means mounted to open said control valve on an actuation thereof, adjustable means mounted to control the rate of opening thereof, adjustable stop means mounted to limit the degree of opening of said carburetor valve by said motor actuated means, and release means positioned to be actuated by an operative movement of said control pedal to release said motor actuated means.

10. A carburetor control mechanism for an automobile having a control pedal, a foot throttle, and a normally closed carburetor control valve operatively connected thereto, comprising motor actuated means mounted to open said control valve on an actuation thereof, adjustable means mounted to limit the opening of said valve by said motor actuated means, release means positioned to be actuated by an operative movement of said control pedal to release said motor actuated means, and intermediate means operatively connected to said pedal and actuated by an operation of said pedal to said release means to restore said release means prior to the return of said pedal to the position at which said release means were operated.

JOSEPH BELLIS.